US009781222B2

(12) United States Patent
Bellessort et al.

(10) Patent No.: US 9,781,222 B2
(45) Date of Patent: Oct. 3, 2017

(54) METHOD, SYSTEM AND SERVER DEVICE FOR TRANSMITTING A DIGITAL RESOURCE IN A CLIENT-SERVER COMMUNICATION SYSTEM (71) Applicant: CANON KABUSHIKI KAISHA, Tokyo (JP)

(72) Inventors: Romain Bellessort, Rennes (FR); Youenn Fablet, La Dominelais (FR); Hervé Ruellan, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 468 days.

(21) Appl. No.: 13/794,017

(22) Filed: Mar. 11, 2013

(65) Prior Publication Data
US 2013/0246583 A1 Sep. 19, 2013

(30) Foreign Application Priority Data

Mar. 14, 2012 (GB) .................................. 1204504.3

(51) Int. Cl.
*H04L 29/08* (2006.01)
(52) U.S. Cl.
CPC .................................... *H04L 67/26* (2013.01)
(58) Field of Classification Search
CPC ....................................................... H04L 67/26
See application file for complete search history.

(56) References Cited

U.S. PATENT DOCUMENTS

| 7,519,722 | B2* | 4/2009 | Nakamura | H04N 7/17318 709/231 |
| 8,117,315 | B2* | 2/2012 | Diep | G06F 17/30899 382/232 |
| 8,640,229 | B1* | 1/2014 | Riegel | H04L 9/3242 726/20 |
| 8,830,225 | B1* | 9/2014 | Karakotsios | G06T 3/60 345/419 |
| 2002/0065800 | A1* | 5/2002 | Morlitz | 707/1 |
| 2002/0066026 | A1 | 5/2002 | Yau et al. | |
| 2003/0101265 | A1* | 5/2003 | Dantzig et al. | 709/226 |
| 2004/0015538 | A1 | 1/2004 | Agarwalla et al. | |
| 2004/0049579 | A1* | 3/2004 | Ims | H04L 67/2823 709/225 |
| 2004/0148344 | A1 | 7/2004 | Navar et al. | |
| 2005/0060497 | A1* | 3/2005 | Krissell et al. | 711/133 |
| 2005/0086318 | A1* | 4/2005 | Aubault | 709/213 |

(Continued)

Primary Examiner — Jerry Dennison
(74) Attorney, Agent, or Firm — Canon USA, Inc. IP Division (57) ABSTRACT The present invention relates to transmitting a digital resource in a client-server communication system. A disclosed method comprises at a main server device: receiving a request for a main resource from a client device; determining at least one missing secondary resource, wherein the at least one missing secondary resource is at least one resource associated with said requested main resource and missing at the main server device; and requesting a secondary server device to push the at least one missing secondary resource to the client device. Thanks to the push initiated by the main server device, the secondary resources required by the main resource become available at the client device before the latter discovers that they are required to exploit or display the main resource.

28 Claims, 4 Drawing Sheets (56) References Cited

U.S. PATENT DOCUMENTS

| | | | |
|---|---|---|---|
| 2005/0114472 A1* | 5/2005 | Tan | H04L 29/06027 709/220 |
| 2005/0198340 A1* | 9/2005 | Nakamura | H04N 7/17318 709/231 |
| 2007/0061282 A1 | 3/2007 | Ganguly et al. | |
| 2007/0233898 A1* | 10/2007 | Raviv | G06F 17/30899 709/238 |
| 2009/0119361 A1* | 5/2009 | Burckart | G06F 17/30902 709/203 |
| 2011/0131297 A1* | 6/2011 | O'Reilly | G06F 17/30864 709/219 |
| 2011/0202953 A1* | 8/2011 | Johnson et al. | 725/35 |
| 2012/0137363 A1* | 5/2012 | Meliksetian et al. | 726/22 |
| 2012/0284786 A1* | 11/2012 | Somani et al. | 726/7 |
| 2013/0179587 A1* | 7/2013 | Xiong et al. | 709/231 |
| 2013/0227056 A1* | 8/2013 | Vecera | H04L 67/02 709/217 |
| 2014/0281918 A1* | 9/2014 | Wei | H04L 67/02 715/234 |
| 2016/0094610 A1* | 3/2016 | Himmelreich | G06F 17/3089 709/217 |

\* cited by examiner

METHOD, SYSTEM AND SERVER DEVICE FOR TRANSMITTING A DIGITAL RESOURCE IN A CLIENT-SERVER COMMUNICATION SYSTEM

This application claims priority from GB patent application number 1204504 of Mar. 14, 2012, which is incorporated by reference herein in its entirety.

FIELD OF THE INVENTION

The present invention relates in general to network communication and in particular, to transmitting a digital resource in a client-server communication system.

BACKGROUND OF THE INVENTION

Client-server architecture has been used for a long time in network communications. It is for example implemented in HTTP (standing for "Hypertext Transfer Protocol"), a well-known protocol for sending web pages over the Internet.

In HTTP, a client device first initiates a network connection (generally a TCP/IP connection) with a server device and then sends a request to the server device to obtain for example an HTML (standing for "Hypertext Markup Language") web page.

In the same network connection, the server device replies to the client request with a response consisting for example of the requested HTML web page. Once the response has been received, the network connection is generally closed.

This describes the "Pull" model of communication where the client device initiates the content delivery, namely requests (i.e. pulls) the digital resource from the server device, and the server device sends the requested resource to the client device in response to the request.

A "Push" model of communication has also been developed as an alternative mechanism, where the content delivery is initiated by the server device hosting the digital resource (i.e. holding the digital resource in an internal storage memory). The client device receives the digital resource without any prior request from it.

This "push" model is currently widely used in Internet-based communications, for example for instant publication of data (stock quotes, news, weather forecast . . . ) and for improved (in terms of time) web page loading. Below reference will be mainly made to web page loading as an illustrative example of the invention, although the invention can concern a variety of other applications.

A generic solution for pushing digital resources to a client device consists in keeping open a network connection established by the client device with a server device. Thanks to the kept-open connection, the server device is thus able to send resources to the client device whenever required.

This is for example used for instant publication of data based on Server-Sent Events. Such events, currently standardized by the World Wide Web Consortium (W3C), make it possible for the server device to push a stream of events and messages to a client device over the existing connection.

Web page loading has also led to notable developments of HTTP. In particular, SPDY (standing for "SPeeDY") has improved HTTP in several ways that offer data push.

In particular, the SPDY draft specification provides "Push transaction" capability for the server device to allow multiple responses to be sent in response to a single client request.

This capability proves to be useful when a client device requests a digital resource such as a web page from a web server device, wherein the digital resource comprises components defined by other secondary resources (for instance, a CSS style sheet, a JavaScript file and various images) and which components are generally needed to exploit or display the main digital resource. This is because, in that case, the server device providing the requested resource may infer that the client device will need the secondary resources. It can then anticipate any client request for those secondary resources by deciding to send the secondary resources it hosts to the client device over the existing network connection before they are requested.

Figure 1:
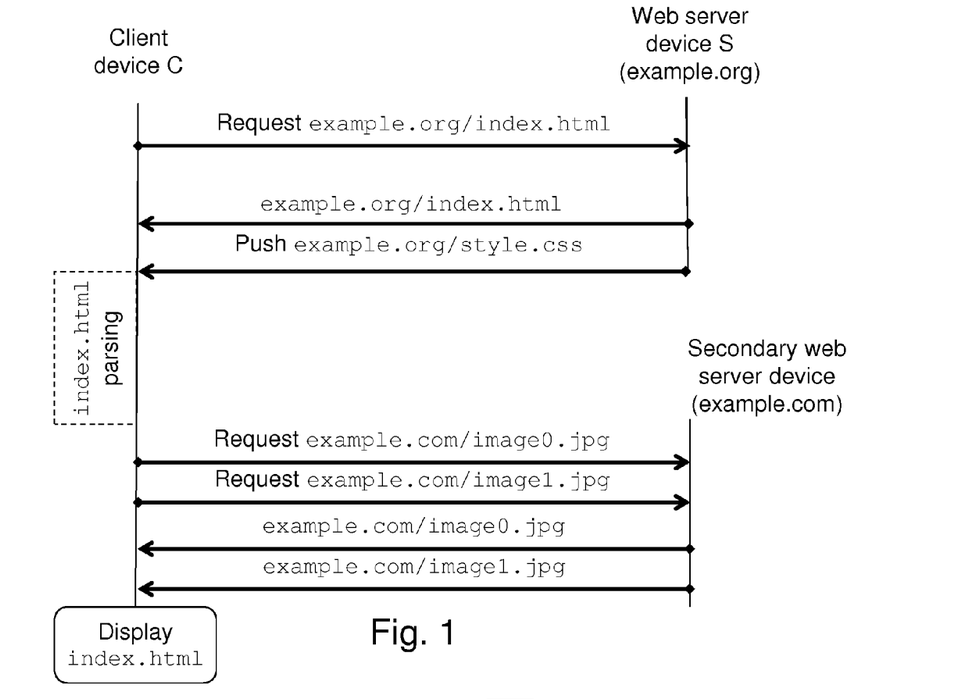
FIG. 1 illustrates the "Push transaction" capability of SPDY.

FIG. 1 illustrates the "Push transaction" capability of SPDY.

A client device C first requests a main resource of web page type and which is referenced index.html, from a main web server device S whose Internet location is example.org. In the example, the web page index.html includes references to components that are required in order to display the whole web page: a style sheet resource referenced style.css also hosted by the main server device S and two picture resources image0.jpg and image1.jpg hosted by another web server, namely the secondary server device whose Internet location is example.com.

Since resource style.css is available at the main server device S, the latter can push that resource to the client device C over the existing network connection.

However, the main server device S is unable to push the two image resources to the client device C since it does not hold them.

Based on conventional processing, the client device C then parses the received web page type index.html to discover that the two image resources image0.jpg and image1.jpg referenced in the main web page are needed for display. The client device C then requests them from the secondary web server device example.com and receives the two resources in response.

It is easy to understand that the "Push transaction" capability is likely to speed up the processing and display of the main resource index.html, in particular if all the secondary resources associated with it or referenced therein are hosted by the main server device S. This is because, thanks to the push, all the secondary resources required by the main resource become available at the client device C when it parses that main resource.

A difficulty arises for the secondary resources that are missing at the main server device S (i.e. not hosted by that server device), such as the above two picture resources image0.jpg and image1.jpg. In particular, they cut off most of the benefits provided by the "Push transaction" capability since by requesting the missing two picture resources, the client device C slows down the potentially optimized processing and display of the main resource.

One goal of the invention is to improve this situation, in particular to transmit the missing secondary resources, i.e. those resources that are missing at the main server device S but hosted by a secondary server device, in a more efficient way.

Prior art provides solutions that are not fully satisfactory.

For example, publication US-2002/0065800 discloses a method for providing resources from a web server to a client computer to enable offline browsing of web sites. In the disclosed method, the web server requested for a web page first gathers all the secondary resources referenced therein, including the secondary resources hosted by remote secondary servers. It then creates a single HTTP archive resource comprising the gathered secondary resources and transmits the single file to the requesting client computer.

A first drawback of this approach is that centralizing the secondary resources in the web server damages the benefits of a distributed web system.

Another drawback regards unnecessary consumption of storage memory. This is because this approach requires duplicating the missing secondary resources in the main web server.

The processing time required to create the archive file is yet another drawback, since it is clearly contrary to the very purpose of the Push model, namely to provide a dynamic, fast and responsive web service.

The present invention has been devised to address at least one of the foregoing concerns, in particular to improve the providing of main and associated secondary resources to a requesting client device, using the Push mechanism.

SUMMARY OF THE INVENTION

In this context, according to a first aspect of the invention, there is provided a method of transmitting a digital resource in a client-server communication system, the method comprising, at a main server device:

receiving a request for a main resource from a client device;

determining at least one missing secondary resource, wherein the at least one missing secondary resource is at least one resource associated with said requested main resource and missing at the server device;

requesting a secondary server device to push the at least one missing secondary resource to the client device.

Correspondingly, according to a second aspect of the invention, there is provided a server device in a client-server communication system, comprising:

a communication interface for receiving a request for a main resource from a client device;

a missing resource module configured to determine at least one missing secondary resource, wherein the at least one missing secondary resource is at least one resource associated with said requested main resource and missing at the server device;

a requesting module for requesting a secondary server device to push the at least one missing secondary resource to the client device.

According to a third aspect of the invention, there is provided a client-server communication system comprising:

a server device as defined above;

a client device configured to request a main resource from the server device;

at least one secondary server device.

According to a fourth aspect of the invention, there is provided a non-transitory computer-readable medium storing a program which, when executed by a microprocessor or computer system in a server device, causes the server device to perform the steps of:

receiving a request for a main resource from a client device;

determining at least one missing secondary resource, wherein the at least one missing secondary resource is at least one resource associated with said requested main resource and missing at the server device;

requesting a secondary server device to push the at least one missing secondary resource to the client device.

The present invention speeds up the obtaining of a main digital resource requested by a client device and of its associated secondary resources, and consequently speeds up the processing, such as display or rendering, of the main requested resource.

This is achieved by requesting a secondary server device to push missing secondary resources to the requesting client device. Therefore, missing secondary resources that used to be requested by the client device are automatically pushed to the client device without it requesting them. The main requested resource and all the secondary resources including secondary resources missing at the requested main server device are thus available at the client device when it discovers them by parsing the main resource for example. As a consequence, the overall time for retrieving all the resources necessary to render a requested web page is reduced, and the display of the web page is achieved faster.

Other features of embodiments of the invention are further defined in the dependent appended claims. While these features are mostly described with reference to methods of the invention, similar features are provided for a corresponding client-server communication system and server device.

For example, the secondary server device generally pushes the at least one missing secondary resource to the client device in response to the request from the main server device. The client device then receives the secondary resources needed to exploit the main resource, without the need to request them. Exploitation, such as display of a web page, is then achieved faster.

According to another example, the main server device generally transmits the requested main resource to the client device in response to the request from the client device. This ensures the main resource is received by the client device. This transmission is preferably done after starting to push the secondary resources to the client device by both the main server device and the secondary server devices.

In particular, requesting the secondary server device to push the at least one missing secondary resource is prior to transmitting the requested main resource to the client device. This feature optimizes consumption of the bandwidth in the communication network of the client-server system. This is because as of reception and the beginning of the analysis (e.g. parsing) of the requested main resource, the client device is liable to request missing secondary resources. However, in case those missing resources have already been detected by the server device and a corresponding request to push them to the client device has been sent to a secondary server device, they are probably being pushed to the client simultaneously or prior to the analysis of the received requested resource the client device is conducting. The above provision thus favours reception of pushed missing secondary resources by the client device before the latter requests them.

According to a particular feature, the at least one missing secondary resource is hosted by the requested secondary server device. This is the most efficient configuration since the missing secondary resource is directly available at the secondary server device that has to push it to the client device.

According to another particular feature, the method further comprises, at the main server device, transmitting a token together with the requested main resource to the client device and inserting the same token in the request to the secondary server device to push the at least one missing secondary resource to the client device. Furthermore, the secondary server device may push the at least one missing secondary resource to the client device together with the token included in the request received from the main server device. The use of the token provides security in the transmission of the secondary resources. This is because the client device is able to determine which received secondary resources have been pushed upon request of the main server device (generally a trusted server), by simply comparing the tokens in received pushed secondary resources and received main resource.

According to an embodiment of the invention, the main server device receives from the secondary server device a notification that the at least one missing secondary resource has been pushed to the client device in response to the request received from the main server device. Thanks to this provision, the main server device is aware of the time at which all the missing secondary resources have been pushed to the client device. Incidentally, embodiments of the invention can thus provide that the requested main resource is only sent by the main server device (in response to the original request) to the requesting client device after receiving the notifications from the requested secondary server devices for all the requests sent by the main server device. This is because from that time the main server device is nearly sure that the client device already has all the missing secondary resources and will thus not request them upon analysing (parsing) the received main resource.

According to another embodiment of the invention, the method further comprises, at the main server device, identifying at least one hosted secondary resource that is associated with the requested main resource and hosted by the main server device; and pushing the at least one identified hosted secondary resource to the client device. Combined with the pushing of missing secondary resources by secondary server devices, this provision makes it possible for the client device to obtain all the secondary resources associated with the requested main resource. It results for the client device in reducing the time for processing the received response, for example to display a web page. Of course, pushing the hosted secondary resources should preferably be prior to transmitting the requested main resource.

According to yet another embodiment of the invention, the method further comprises determining whether a secondary server device has capabilities to operate as a push server to push a resource to the client device. This makes it possible for the main server device to adapt its strategy to supply the missing secondary resources to the client device.

In particular, determining whether a secondary server device has capabilities to operate as a push server comprises determining whether a network connection between the secondary server device and the client device is already established or the secondary server device is authorized to establish a new network connection with the client device. A push model according to the invention is thus still based on an existing network connection, or may use capability of the secondary server device to request a new network connection with the client device over which the resources will be pushed. Such determination can be performed using data sent between the server devices about their capabilities and currently established network connections.

According to a particular feature, determining whether a secondary server device has capabilities to operate as a push server to push a resource to the client device is performed by the main server device prior to requesting the secondary server device to push the at least one missing secondary resource to the client device in case of positive determination. The above provision makes it possible for the main server device to efficiently select and request a secondary server device that is operative with the client device. Push of the at least one missing secondary resource is thus ensured before the client device discovers they are needed by parsing the main resource.

In particular, in case of negative determination, the main server device requests the at least one missing secondary resource from the secondary server device and pushes the at least one missing secondary resource received from the secondary server device to the client device. As already suggested above, such push of the missing secondary resources should be made prior to transmitting the requested main resource. All the same, thanks to this provision, missing secondary resources are received by the client device even if they are hosted by secondary server devices not adapted to push such resource to the client device.

According to another particular feature, the method further comprises, in case of negative determination, determining at least one other server device trusted by the client device and/or the secondary server device and requesting the trusted server device to push the at least one missing secondary resource to the client device. This is an alternative provided to still push the missing resources to the client device, still with the view of providing a fast display of the requested main resource.

In particular, the trusted server device has a network connection already established with the client device or is authorized to establish, on its own initiative, a new network connection with the client device. This ensures an efficient trusted server device is selected.

Also, the trusted server device may request the at least one missing secondary resource from the secondary server device. This is because that trusted server device is likely to not host the missing secondary resource since it is selected by default due to unavailability of a network connection with the client device for the secondary server device hosting said missing secondary resource.

In one embodiment of the invention, the secondary server device determines whether it has a network connection already established with the client device or it is authorized to establish a new network connection with the client device; wherein, in case of positive determination, the secondary server device pushes the at least one missing secondary resource to the client device over the network connection already established or the new network connection once established.

According to a particular feature, in case of negative determination, the secondary server device requests a trusted server device to push the at least one missing secondary resource to the client device, the trusted server device having a network connection already established with the client device or being authorized to establish, on its own initiative, a new network connection with the client device. The other server device is seen as trusted from the secondary server device's perspective (for example because they both belong to the same trusted environment) but may also be trusted from the client device's perspective.

In particular, the request from the secondary server device comprises the missing secondary resource to be pushed. This makes it possible for the trusted server device to actually push that resource.

In particular, the trusted server device is the main server device, and possibly the main server device, the secondary server device and the trusted server device belong to the same organisation.

The above provision means that the secondary server device will select and request another server device to act on behalf of it for pushing the missing secondary resource to the client device. It may even mean requesting back the main server device to push the missing secondary resource to the client device.

As discussed above, a secondary resource associated with the main resource may be a resource referenced within the main resource, for example a component such as CSS documents, JavaScript documents, images, etc. needed to complete the execution and display of an HTML or XHTML main resource.

However, other kinds of secondary resources may exist and may co-exist together or with the above kind.

For example, according to one kind, a secondary resource associated with the main resource is a resource that is statistically requested after the main resource by the same client device. This makes it possible for the main server device to anticipate the loading of a next content, for example a next HTML page. As a consequence, this subsequent loading and possible display is speeded up.

According to another kind, a secondary resource associated with the main resource is a resource requested by a script embedded within the main resource. Again, this saves time when the client device executes the script since data (a resource) needed for it is already present at the client device.

According to an embodiment of the invention, determining at least one missing secondary resource that is hosted by a secondary server device comprises building a secondary server list including secondary server devices hosting missing secondary resources associated with the main resource, and sending the secondary server list to the client device. This provision makes it possible for the client device to anticipate establishment of network connections with the secondary server devices of the list. As a consequence, it will become easier for the secondary server devices to push their stored missing secondary resources upon requests from the main server device.

According to another embodiment of the invention, the client device comprises a cache memory configured to store requested main resources and secondary resources already received, and the client device sends a list of cached resources to the main server device and to secondary server devices. The client device may use the above received secondary server list to determine to which server device it should send the list of cached resources. The above provision makes it possible for the client-server system to apply transmission policies according to which unnecessary transmissions (by push) of secondary resources already cached are avoided. Consumption of the network bandwidth and of processing time at the server and client devices is thus reduced.

According to yet another embodiment of the invention, determining at least one missing secondary resource that is hosted by a secondary server device comprises determining, by the main server device, all the missing secondary resources hosted by the same secondary server device and sending, by the main server device, a single request to the secondary server device to push all the missing secondary resources that it hosts. This approach reduces use of the communication network since at most one single request is likely to be sent for each secondary server device.

Another aspect of the invention relates to a method of transmitting digital resources in a client-server communication system substantially as herein described with reference to, and as shown in, FIG. 3; FIG. 6; FIGS. 6 and 7; FIGS. 6, 7 and 8; FIGS. 3, 6, 8 and 8 of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

The invention provides methods and devices for transmitting digital resources in a client-server communication system. An exemplary application is the Internet where the well-known HTTP protocol is client-server based to provide digital resources such as web pages.

Figure 2:
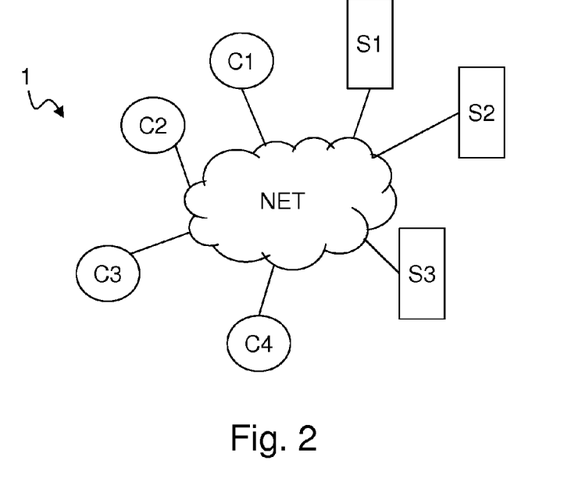
FIG. 2 illustrates a typical web client-server communication system in which embodiments of the invention may be implemented.

A typical web client-server communication system 1 is shown in FIG. 2, in which embodiments of the invention may be implemented.

It comprises a communication network NET such as an IP-based local or wide area network (LAN, WAN) and a plurality of web server devices Si that offer IP-based services, such as web sites. Consequently, each web server device Si hosts digital resources in internal storage memories and can provide them to any requesting party.

Generally, a requesting party is a client device Ci as shown in the Figure, which client device implements a web browser through which a user interacts and that generates and sends HTTP requests to the web server devices.

The same device of the client-server communication system can embed both client and server capacities.

As briefly introduced above and as further described below, a method according to the invention comprises, at a main server device:

receiving a request for a main resource from a client device;

determining at least one missing secondary resource, wherein the at least one missing secondary resource is at least one resource associated with said requested main resource and missing at the main server device;

requesting a secondary server device to push the at least one missing secondary resource to the client device.

The client device thus obtains missing secondary resources from server devices other than the requested server device and without having requested them. It is on the main server device's initiative that the missing secondary resources are pushed to the client device by other secondary server devices that generally host the missing secondary resources.

One may note that the main server device may be any server device of the system 1 as soon as it is requested by the client device. Given a request from the client device, the other server devices are the secondary server devices.

Also as disclosed below the at least one missing secondary resource is generally hosted by the requested secondary server device.

Figure 3:
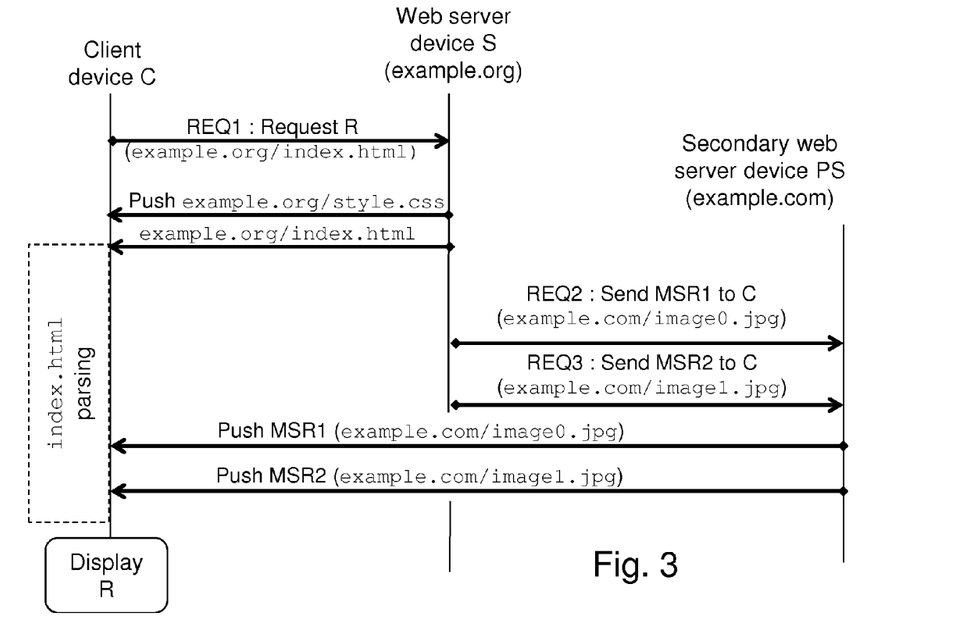
FIG. 3 illustrates the present invention based on the example of FIG. 1.

FIG. 3 illustrates the same example as FIG. 1, but with implementation of the above method according to the invention.

The client device C still requests (REQ1) the main server device S example.org for the main resource R index.html, a web page that includes references to secondary resources SR, namely a style sheet resource style.css hosted by the main server device S and two picture resources image0.jpg and image1.jpg hosted by a secondary server device PS.

As for FIG. 1, the main server device S identifies at least one hosted secondary resource SR that is associated with the requested main resource R and hosted by the main server device S; and pushes the at least one identified hosted secondary resource SR to the client device C. In the example, the main server device S determines that the secondary resource SR0 style.css is needed for displaying the requested web page index.html and then pushes it to the client device C over the existing TCP/IP network connection established since the request REQ1 was sent by the client device.

Once the main server device S has pushed all the secondary resources SR it hosts, the main server device transmits the requested main resource R (index.html in the example) to the client device C in response to the request from the client device. This triggers for the client device C a parsing operation in which the client device parses the received web page to discover any secondary resource needed to display said web page.

In a variant, the main server device S can transmit the requested main resource R before pushing the secondary resources SR it hosts to earlier trigger the parsing of the web page by the client device C, and thus to earlier display its content. However, to efficiently use the push opportunity provided by SPDY, it is preferable that any push of secondary resource be initiated prior to sending the main requested resource R.

Also, the main server device S determines that the secondary resources example.com/image0.jpg and example.com/image1.jpg are needed but cannot be pushed by it since it does not hold them, i.e. they are missing secondary resources MSR.

Thanks to the URL of these secondary resources, the main server device S is able to request (push requests REQ2 and REQ3) the secondary server device PS (example.com) to push the missing secondary resources MSR.

Since the secondary server device PS hosts the missing secondary resources MSR, the secondary server device PS pushes the at least one missing secondary resource to the client device C in response to the request REQ2-3 from the main server device S. In particular, it pushes the missing secondary resource over an existing network connection with the latter or over a new network connection that the secondary server device PS is able to initiate with the client device C.

The two missing picture resources are thus received by the client device C while it is parsing the web page index.html. Given the timing, there is no need for it to request them from secondary server devices. Consequently, the web page is loaded faster.

In a particular embodiment not shown, the secondary server device PS notifies the main server device S that the at least one missing secondary resource MSR has been pushed to the client device C in response to the request REQ2-3 received from the main server device S. This makes it possible for the main server device to transmit the requested main resource R after receiving the notifications from the requested secondary server devices, i.e. only when it is sure that the missing secondary resources MSR have been pushed by the secondary server devices.

In a broader approach of this particular embodiment, it may be provided that the request REQ2-3 of the main server device S to the secondary server device PS to push the at least one missing secondary resource MSR is prior to transmitting the requested main resource R to the client device C. This also contributes to the client device C receiving all or the majority of missing secondary resources before or during parsing of the received main resource.

Figure 4:
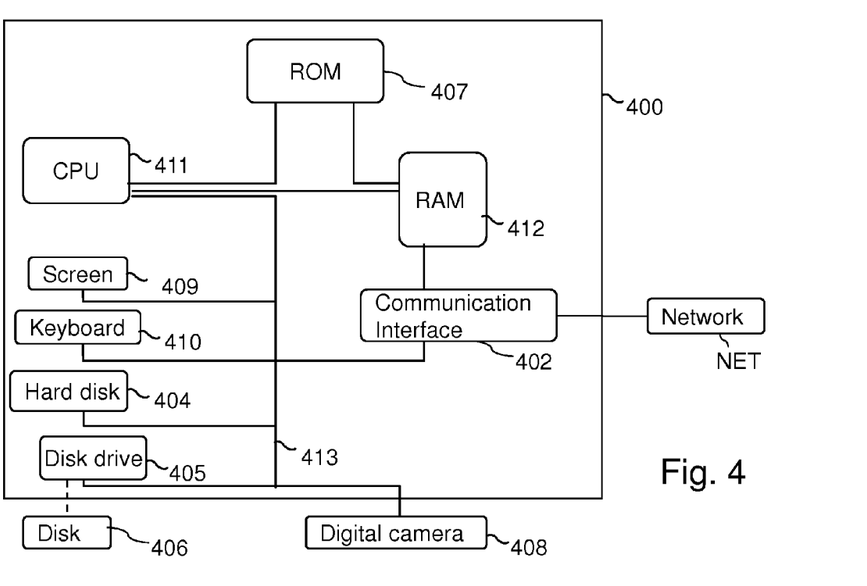
FIG. 4 is a block diagram illustrating components of a communicating device in which embodiments of the invention may be implemented.

FIG. 4 schematically illustrates a communicating device 400, either a client device C or a server device S, or a device embedding both functionalities, configured to implement at least one embodiment of the present invention. The communicating device 400 may be a device such as a microcomputer, a workstation or a light portable device. The communicating device 400 comprises a communication bus 413 to which there are preferably connected:

a central processing unit 411, such as a microprocessor, denoted CPU;

a read only memory 407, denoted ROM, for storing computer programs for implementing the invention;

a random access memory 412, denoted RAM, for storing the executable code of methods according to embodiments of the invention as well as the registers adapted to record variables and parameters necessary for implementing methods according to embodiments of the invention; and a communication interface 402 connected to the communication network NET over which a client-server based communication can be implemented. The communication interface is provided to send requests or digital resources or to push secondary resources (depending on whether the communicating device acts as a client device or a server device), as well as to receive the requests, the digital resources or the secondary resources.

Optionally, the communicating device 400 may also include the following components:

a data storage means 404 such as a hard disk, for storing computer programs for implementing methods of one or more embodiments of the invention and for storing (in the case of a server device) digital resources including main resources that can be directly requested by a client and secondary resources that are associated with main resources, during the implementation of one or more embodiments of the invention, and for implementing a cache memory when required;

a disk drive 405 for a disk 406, the disk drive being adapted to read data from the disk 406 or to write data onto said disk;

a screen 409 for displaying data such as a web page in the case of the client device and/or serving as a graphical interface with a user, by means of a keyboard 410 or any other pointing means.

The communicating device 400 can be connected to various peripherals, such as for example a digital camera 408, each being connected to an input/output card (not shown) so as to supply data to the communicating device 400.

The communication bus provides communication and interoperability between the various elements included in the communicating device 400 or connected to it. The representation of the bus is not limiting and in particular the central processing unit is operable to communicate instructions to any element of the communicating device 400 directly or by means of another element of the communicating device 400.

The disk 406 can be replaced by any information medium such as for example a compact disk (CD-ROM), rewritable or not, a ZIP disk or a memory card and, in general terms, by an information storage means that can be read by a microcomputer or by a microprocessor, integrated or not into the communication device, possibly removable and adapted to store one or more programs whose execution enables a method according to the invention to be implemented.

The executable code may be stored either in read only memory 407, on the hard disk 404 or on a removable digital medium such as for example a disk 406 as described previously. According to a variant, the executable code of the programs can be received by means of the communication network NET, via the interface 402, in order to be stored in one of the storage means of the communicating device 400, such as the hard disk 404, before being executed.

The central processing unit 411 is adapted to control and direct the execution of the instructions or portions of software code of the program or programs according to the invention, which instructions are stored in one of the aforementioned storage means. On powering up, the program or programs that are stored in a non-volatile memory, for example on the hard disk 404 or in the read only memory 407, are transferred into the random access memory 412, which then contains the executable code of the program or programs, as well as registers for storing the variables and parameters necessary for implementing the invention.

The execution of the program or programs instantiates software modules implementing specific functions, for example a missing resource module (at the main server device) configured to determine at least one missing secondary resource, wherein the at least one missing secondary resource is at least one resource associated with said requested main resource and missing at the server device; a requesting module (at the main or secondary server device) for requesting a secondary server device (possibly the server device hosting the missing secondary resource) or a trusted server device to push the at least one missing secondary resource to the client device; a hosted secondary resource identifying module (at the main server device) configured to identify at least one hosted secondary resource that is associated with the requested main resource and hosted by the main server device; a connection determination module (at the main or secondary server device) configured for determining whether a network connection between a secondary server device and the client device is already established or the secondary server device is authorized to establish a new network connection with the client device; a token managing module (at any communication device) configured to handle a token as briefly introduced above and further described below; a notification means (at a secondary server device) configured to provide notification to the main server device as described above and below.

In this embodiment, the device is a programmable apparatus which uses software to implement the invention. However, alternatively, the present invention may be implemented in hardware (for example, in the form of an Application Specific Integrated Circuit or ASIC).

Figure 5:
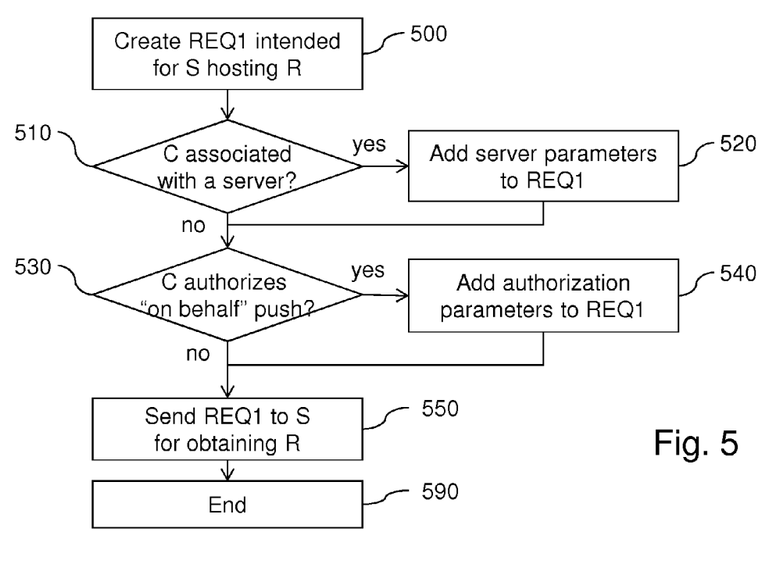
FIG. 5 is a flowchart illustrating general steps for a client device to request a main digital resource from a server device according to embodiments of the invention.

FIG. 5 illustrates general steps for the client device C to request a main digital resource R from a server device S.

The requesting process starts at step 500 where the client device C creates a request REQ1 for the digital resource R, intended for S, the server device hosting R. For example, the server device can be known from the URL defining R, as it is used in the Internet world (e.g. a domain name).

At step 510, the client device determines whether it has a server functionality associated with it, i.e. embedded within the same device. For instance, if the client device C has a web browser to generate the above request REQ1, the web browser or an operating system may also comprise a server that is likely to be accessible by other computers connected to the same network NET. In this respect, if a secondary server device PS can connect to the server associated with the client device C, then a network connection can be established between C and PS at the initiative of PS and can be used for push purposes as implemented by the present invention.

In case of positive check (C is associated with a server), parameters of that server are added to request REQ1 at step 520 to make it possible for other servers to connect the associated server.

In a general manner, any parameters to add to a request may be included in a specific header of the request. This is particularly efficient with the HTTP model.

Parameters of that associated server may include an IP address (or a domain name) and a port so that another server device can request and establish a network connection with it. Of course, more parameters may be included, for instance a connection key required for other parties to initiate a network connection with the associated server. Such key may change periodically and be specific for a given main server device S to which request REQ1 is to be sent. This key will be transmitted in the push requests REQ2-3 to the secondary server devices for them to establish a network connection with C. Thanks to this key, C is able to track the origin of any connection request by secondary server devices.

In a particular embodiment, C applies security policies according to which it is desired to communicate the associated server's parameters only to specific server devices, for instance server devices belonging to a white list of authorized server devices (e.g. based on a central authority or on recommendations of a security service) or to trusted server devices. In this particular embodiment, a test to determine whether the main server device S (for which REQ1 is intended) belongs to such a white list or to a class of trusted server devices should be performed prior to step 520, to authorize or not authorize the addition of the parameters to REQ1. In case of adding the parameters to REQ1, the list of C's trusted server devices or the white list may be also added to REQ1 so that the secondary server devices selected to push missing secondary resources to C are selected from the list for security purposes.

A particular case concerns a situation where C is on a local network and its associated server is connected to another server such as a NAT server (standing for Network Address Translation) which interfaces the local network with a global network. In that case, the server parameters may be the IP address of the NAT server with a specific port associated with C's associated server, which allows server from the global network to establish a network connection with the local server associated with C.

Trusted server devices are server devices linked together with a trust mechanism, such as an authentication mechanism based on cryptography.

Following step 520 or in case of negative check (C has no server), step 530 consists in checking whether C authorizes any server devices Si to perform push operations on behalf of other server devices.

Push on behalf of other server devices means that a server device may be allowed to push a resource Ri hosted by a different server device. Usually, this is not possible since the server devices are generally allowed to send only the resources they host. However, in the present embodiment of the invention, such an "on-behalf-of" push extends the number of server devices capable of pushing secondary resources to the client device, in particular if the latter trusts only a few server devices.

In the particular case where the client device C also embeds a server that allows any server to connect with it, the "on-behalf-of" push is not needed since any secondary server device can initiate and establish a connection with C. As a consequence, the "on-behalf-of" push will be enabled when some server devices are not allowed to connect to C.

If C authorizes some server devices to perform push operations on behalf of other server devices, parameters describing such authorization are added to request REQ1 at step 540. These parameters may, for instance, be a list of trusted server devices authorized to perform push on behalf of other server devices. Such authorized server devices may provide a security service to ensure that the secondary resources they push to C on behalf of other server devices are safe.

Following step 540 or if C does not authorize the "on-behalf-of" push, request REQ1 is sent to the main server device S at step 550. The process then ends at step 590.

Figure 6:
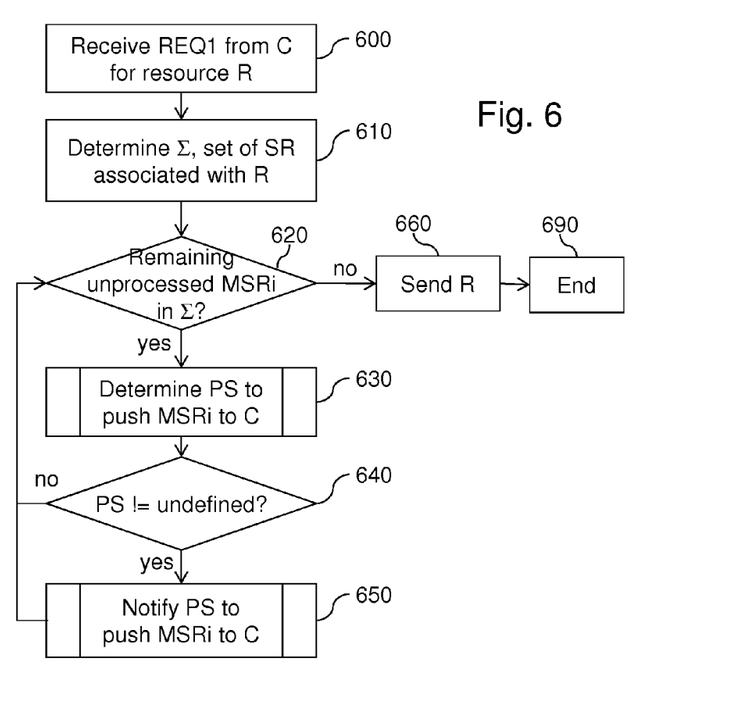
FIG. 6 is a flowchart illustrating steps of handling the request of FIG. 5 by the server device according to embodiments of the invention.

REQ1 is to be received by the main server device S. FIG. 6 illustrates general steps of the handling of REQ1 by the main server device S.

The process starts at step 600 where the main server device S actually receives a request for a main resource R from a client device C, in the above example it receives REQ1.

At step 610, a set Σ of secondary resources SRi associated with R is determined.

A secondary resource associated with the main resource is for example a resource referenced within the main resource R. Typically, R is an HTML (or XHTML) document, which comprises references to components, e.g. CSS documents, JavaScript documents, JPEG, PNG or GIF images, etc. All these documents referenced in the HTML file are necessary to provide the full experience associated with the HTML document, and as a consequence, they are considered as associated with the HTML document, hence are members of the set Σ.

Additionally, other documents may be added to Σ as secondary resources. As an example, a secondary resource associated with the main resource is a resource that is statistically requested after the main resource by the same client device. For example if the main server device S maintains statistics about digital resources downloaded from it, it may determine that a majority of client devices first requesting the main digital resource R also requests, later on, a second digital resource R'. In such a case, the second resource R' can be added to Σ as a secondary resource SR associated with R.

Similarly, a secondary resource associated with the main resource may be a resource requested by a script embedded within the main resource. For example, a server administrator may know that a given digital resource R' will be requested through a script associated with the main digital resource R (for example a script embedded therein). In that case, R' is added to Σ as a secondary resource SR associated with R.

To summarize the various kinds of secondary resources, in the end Σ comprises all the secondary resources that are likely to be requested by the same client device that requested the main resource R. Among these secondary resources SR, are secondary resources hosted by the main server device S and missing secondary resources MSRi that are not hosted by the main server device S but by secondary server devices.

The hosted secondary resources are pushed by the main server device S to C over the existing network connection used for transmitting REQ1. This is a process similar to the push of the resource style.css in FIG. 3.

After step 610, step 620 consists in checking whether there remains any unprocessed missing secondary resource MSRi of Σ in order to iteratively process each missing secondary resource of Σ.

For a given missing secondary resource MSRi, step 630 (further described below with reference to FIG. 7) consists for the main server device S in determining a secondary server device PS of the client-server communication system 1 of FIG. 2 that can be requested to push MSRi to C. This may take into account any white list or list of trusted server devices included in the received REQ1.

At step 640, whether PS is undefined is evaluated.

If it is undefined, the process loops back to step 620 to consider the next unprocessed secondary resource MSRi.

If PS is not undefined, step 650 is carried out in which the main server device S requests the determined secondary server device PS to push the missing secondary resource MSRi to the client device C. This corresponds to push requests REQ2 and REQ3 in FIG. 3. As suggested above, that push request REQ2-3 to a secondary server device PS may include parameters of the server associated with C, in order to ease connection of PS to C in case no network connection is already established between them. The push of MSRi resulting from the request of step 650 is further described below with reference to FIG. 8.

Once the main server device S has notified PS to push MSRi to C, the process loops back to step 620 to consider the next unprocessed secondary resource MSRi. Once all have been processed, the requested main resource R is transmitted to C at step 660, and the process ends at step 690.

In a particular embodiment of the invention, when determining at least one missing secondary resource MSRi that is hosted by a secondary server device (i.e. before step 620), the main server device builds a secondary server list including secondary server devices hosting missing secondary resources MSRi associated with the main resource R, and sends the secondary server list to the client device C.

Thanks to this list, C can initiate a network connection with each of the secondary server devices in the list to which it is not already connected (possibly with only trusted server devices or those belonging to a white list). Assuming that C will establish a network connection with these secondary server devices, the main server device S will not have to consider the network connection issue as described below when selecting a secondary server device for pushing a missing secondary resource (during the process of FIG. 7).

A particular case of the notification of that secondary server list to C may consist in using a specific HTTP header in the HTTP response (to send R) to describe the secondary server list.

Another particular case may consist in using already defined HTTP codes. For instance, using HTTP 303 code ("see other"), the client device C may be indicated to see another resource. Hence, if HTTP 303 specifies the location of a secondary server device hosting one of the missing secondary resources MSRi from Σ, C will connect to that location, i.e. to the secondary server device.

In practice, HTTP 302 code may also be used since web applications often use 302 code as if it was a 303 code. To avoid cancellation of the display of main resource R in favor of the display of only the secondary resource at the location specified therein, HTTP 302/303 codes will be carefully used, in particular, the HTTP 302 or 303 message pushed to the client device C will not be the response to the main request REQ1.

In a variant to sending the secondary server list to C, the main server device S may transmit the parameters of the server associated with C (as described above with reference to steps 510 and 520) within the push request REQ2-3 so that PS is able to easily initiate a network connection with C if needed.

In another particular embodiment of the invention that may be combined with the above particular embodiment, when determining at least one missing secondary resource MSRi that is hosted by a secondary server device (i.e. before step 620), the main server device determines all the missing secondary resources MSRi hosted by the same secondary server device PS and sends a single request REQ2-3 to the secondary server device PS to push all the missing secondary resources that it hosts.

Practically, the missing secondary resources MSRi comprised in Σ may be sorted or grouped based on the secondary server device hosting them. Then, instead of determining a secondary server device PS at step 630 for each missing secondary resource MSRi, a single secondary server device PS can be determined for each group of missing secondary resources and then a single respective push request REQ2-3 can be sent to each corresponding secondary server device. That means that step 650 no longer consists in sending one push request REQ2-3 per MSRi, but consists in sending a single request to each PS concerned, that request including the list of the missing secondary resources MSRi to be pushed by that PS to C.

In a slight variant, step 650 can be delayed after all the MSRi have been processed, so as to perform grouping of those MSRi based on their respective secondary server device determined at step 630. Step 650 then only sends a single push request REQ2-3 to a given secondary server device PS hosting several MSRi.

In an improved embodiment of the invention, the client device C comprises a cache memory configured to store requested main resources R and secondary resources SR already received, and the client device C sends a list of cached resources to the main server device S and/or to secondary server devices PS. This makes it possible for the main server device S to lighten its processing. For example, the set Σ of secondary resources SR may be reduced by removing the secondary resources already cached by the client device C, since there is no need to retransmit them to the client device. Fewer iterations of the processing (steps 630-650) will consequently be performed.

Sending the list of cached resources solely to the main server device S is one among several strategies or policies that may be implemented in the client-server communication system 1.

In a slight variant, the main server device does not sort the secondary resources of Σ, but avoids pushing any hosted secondary resource that is already cached. Furthermore, when requesting a secondary server device PS to push a missing secondary resource MSR to the client device C, the main server device S may also forward the list of resources cached by C to that secondary server device PS. In that case, it is the secondary server device that decides whether to push MSR or not, according to the provided list.

In another slight variant, the client device C may decide to send the list of cached resources to each server device that establishes a network connection with it (either on C's initiative or on the server's initiative). In that case, each connected server device applies the transmission policy based on the received list.

In another variant, the client device C may generate a personalized list of cached resources per server device (including the main server device and the secondary server devices), the list including all the resources already received from said server device. That personalized list is sent to the associated server device as soon as a network connection is established with it. The application of the transmission policy is therefore implemented in each server device based on the received personalized list.

Above step 630 of determining a secondary server device PS to push a given missing secondary resource MSR is now described with reference to FIG. 7.

The process starts at step 700 by determining the secondary server device or devices SS hosting the missing secondary resource MSR. Generally, there is only one secondary server device SS that hosts MSR. For example, it is the server device corresponding to the URL defining MSR in the main resource R.

When a white list or a list of trusted server devices is defined by the client device as disclosed above, the secondary server device determined at step 700 should belong to such a list.

Next, step 710 consists in checking whether the secondary server device SS has capabilities to operate as a push server to push a resource to the client device C. If several secondary server devices host MSR, the check is first made on all those secondary server devices to determine whether one of them can be used as Push Server.

The check of step 710 may be based on various criteria.

For example, the main server device S can store and maintain up-to-date a list of secondary server devices that are referenced by the resources hosted by S itself (for instance all the URLs within the resources hosted by S). For each secondary server device of the list, there is provided an indication as to whether the corresponding secondary server device has capabilities for pushing resources (i.e. is valid for pushing).

This indication may be set statically for all or parts of the devices in the list. For example, for all the server devices belonging to and managed by the same organization as the main server device S, it is easy for one operator of the organization to know which server devices are designed to perform push of resources.

The push validity indication of all or part of the other secondary server devices may be dynamically determined. For example, it may be computed from statistics resulting from previous attempts of said secondary server devices to push resources. Information from the attempts may be gathered by S from the push confirmation or push invalidation sent by the secondary server devices in response to S's push requests REQ2-3.

In more detail, the push confirmation or push invalidation sent to S may comprise additional performance information on the secondary server devices when pushing the resource, such as CPU and memory load and, in case of push success, the efficiency of the transfer (transfer total time, average bandwidth, etc.). Based on the additional performance information, the main server device S can compute statistics and determine an average success ratio. Comparing the statistics and the average success ratio to threshold values (e.g. success ratio threshold of 50%) makes it possible for S to classify each of the secondary server devices as valid or invalid for push For security reasons, any server device not in the list should be considered as invalid for push.

In a particular embodiment that may avoid below steps 810 and 820 having to be performed in FIG. 8 below (even if the steps can be kept for verification at the secondary server device), the main server device may determine whether a network connection between the secondary server device SS and the client device C is already established or the secondary server device SS is authorized to establish a new network connection with the client device C. This information can be used as an additional criterion at step 710, meaning that SS is valid for pushing resources to C only if it has a network connection already available with C or has capabilities to establish such a connection. In case of positive determination (together with the other criteria), the process goes on at step 720.

The determination may be based on data exchanged between the server devices of system 1, which data may specify the currently established connections for each server device.

Figure 7:
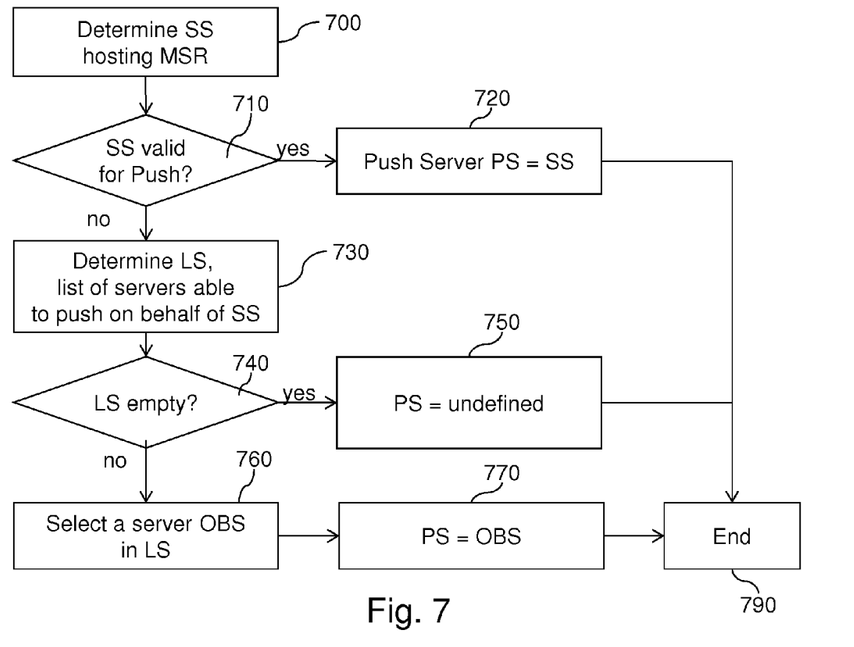
FIG. 7 is a flowchart illustrating steps of determining a secondary server device to push a missing secondary resource to the client device according to embodiments of the invention.
Figure 8:
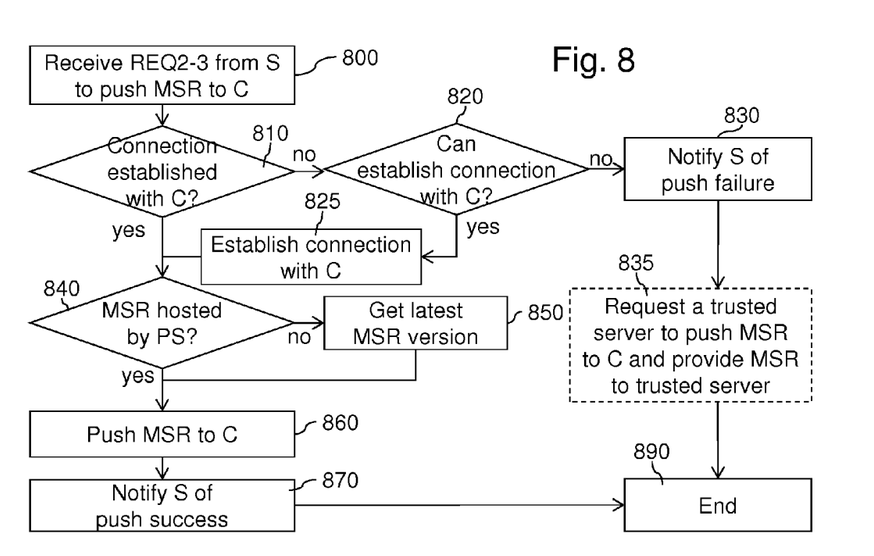
FIG. 8 is a flowchart illustrating steps of managing a request to push a missing secondary resource by a secondary server device according to embodiments of the invention.

Since the process of FIG. 7 occurs at step 630 of FIG. 6, i.e. before step 650 of requesting the secondary server device PS, this determination is performed prior to requesting the secondary server device PS to push the at least one missing secondary resource MSR to the client device C.

If SS (or one of the secondary server devices hosting MSR) can be used as a Push server, it is defined as the secondary server device to be requested, referenced PS in the process of FIG. 6 (step 720). The process then ends at step 790.

Otherwise (if SS or all the secondary server devices hosting MSR cannot operate as a Push server), the main server device determines at least one other server device trusted by the client device and/or the secondary server device. To do so, a list LS of server devices able to push MSR to C on behalf of SS is determined at step 730. These server devices do not necessarily host MSR since SS can provide it to them if needed. The list may comprise secondary server devices of system 1 as well as S.

The server devices of list LS should meet one or more conditions among the following conditions, when they are implemented: belonging to any white list or list of trusted server devices provided by C; being valid for push as defined previously with reference to step 710; possibly having a network connection already established with the client device or being authorized to establish, on its own initiative, a new network connection with the client device.

An additional condition may be used, according to which S and the server devices in list LS should trust each other. The fact that different server devices trust each other may be based on periodically exchanged data between S and the secondary server devices of system 1.

Following step 730, step 740 consists in checking whether list LS is empty.

If it is, no secondary server device for pushing MSR has been found and PS is undefined (step 750). The process then ends at step 790.

In a particular embodiment, a decision may be made in that case (PS undefined) whereby the main server device requests the at least one missing secondary resource from the secondary server device hosting that resource and pushes the at least one missing secondary resource received from the secondary server device to the client device. That means that the main server device operates in replacement of the secondary server device hosting the missing secondary resource. This approach appears efficient because the main server device has already a network connection established with C.

In particular, this approach may also replace step 730, meaning that in case of a negative check 710, the main server device automatically instructs itself to push the missing secondary resource.

If LS is not empty, a secondary server device is selected from among the servers of list LS, at step 760, and that selected secondary server device is defined as the Push Server PS at step 770. That means that the main server request is about to request a trusted server device to push the at least one missing secondary resource to the client device. The process then ends at step 790.

The selection of step 760 may be based on various criteria, including those used to determine the push validity of a server device. For example, the selected secondary server device may be the one that has the lowest transmission time among those of LS, the transmission time considered possibly being a recent transmission time computed from recent statistics. Alternatively or in combination, performance data about recent CPU and memory load may also be considered: for example, even if the average transmission time is low for a given server device, the actual transmission time is likely to be greater in case of high load. Therefore, the selection can be based on both average transmission time and current load.

Another way of determining the efficiency of a secondary server device for pushing data consists for the main server device S in including, in its response to C, a timestamp corresponding to the sending of REQ2-3 to the secondary server device or devices PS. Based on this timestamp, C is able to measure the delay between the sending of REQ2-3 and the reception of the pushed missing secondary resources from PS. Then C can send this information to S which can use it as statistical information for selection at step 760.

One may note that such information about an average delay between REQ2-3 and the reception of corresponding pushed resources can also be used by S to delay its transmission of the requested main resource R to C (step 660) in order to ensure the missing secondary resources be received by C before the latter ends parsing R.

In a particular embodiment, step 760 may be switched to the client device C itself. For example, the main server device S may send list LS of valid candidates to C in order for the latter to select one of them based on criteria, for example on location or network capacities or any statistical information as disclosed above.

As described above, once PS has been defined at step 630, PS is requested at step 650 by S to push MSR. FIG. 8 illustrates steps performed by PS to push MSR to C.

This process starts at step 800 by receiving a push request REQ2-3 from S, said request requesting PS to push MSR to C.

The secondary server device then determines whether it has a network connection already established with the client device or it is authorized to establish a new network connection with the client device. This is to be sure that it is able to push MSR to C. This determination is conducted through steps 810 and 820.

At step 810, it is checked whether PS already has a network connection established with C.

The information provided by S in REQ2-3 to identify C is basically C's IP address.

However, the IP address may sometimes prove not to be sufficient to fully identify C. For example, C's IP address may be an address shared by various network nodes and by different applications on each of these nodes. In the HTTP model, the user-agent representing the client is used to characterize C more precisely.

Client C's identifier or login can thus be used if S and the secondary server devices use such data (for example if they are managed by the same organization, in which case a single authentication mechanism may be used by any of these server devices).

In case the identifier/login proves not to be sufficient or not implemented, an additional identifying parameter may be added in request REQ1 sent by C in order to identify itself. For example, this may be a random value with a sufficiently high number of digits. This additional identifying parameter may be added to a cookie, to a URL through a specific parameter, or as protocol-specific information (e.g. a specific header in the HTTP model). Then, by providing this additional identifying parameter to the secondary server devices, S fully identifies C. C also provides this additional identifying parameter to the secondary server devices when C connects to them (for example using the above secondary server list sent by S). This makes it possible for these secondary server devices to easily check whether they already have a network connection with C. In addition, if these secondary server devices do not have a network connection already established but need a connection, they can rely on this additional identifying parameter to initiate such a network connection with C.

If there is no network connection already established with C (output "no" at step 810), it is checked at step 820 whether such a network connection can be established with C, on PS's initiative, for example based on the parameters of the server associated with C, which parameters may be included in REQ2-3 received from S. If possible, the network connection is initiated by PS so as to establish the network connection with C at step 825.

If this is not possible, PS notifies S that the push operation failed at step 830, and the process ends at step 890. In a particular embodiment, the secondary server device may then request (step 835) a trusted server device (as defined above) to push the at least one missing secondary resource to the client device, the trusted server device having a network connection already established with the client device or being authorized to establish, on its own initiative, a new network connection with the client device. Furthermore, the request from the secondary server device may comprise the missing secondary resource to be pushed.

For example, the trusted server device may be the main server device S if it has first been determined that S can act as a Push Server on behalf of the selected secondary server PS (i.e. S belongs to LS as determined in step 730). The failure notification sent to S thus may comprise the missing secondary resource MSR to be pushed or a value indicating its last update. Then, server S can efficiently act as an "on-behalf-of" Push Server to push MSR to C.

If a network connection is established with C (after test 810 or step 825), step 840 consists in checking whether MSR to be pushed as identified in REQ2-3 is hosted by PS or not.

This can be directly inferred from MSR's URL as specified in REQ2-3 by S.

If MSR is not hosted by PS, then the latest version of MSR is obtained at step 850 by requesting the at least one missing secondary resource from the secondary server device hosting the resource. Typically, PS requests the resource MSR to be pushed to the secondary server device hosting it thanks to MSR's URL for example, which secondary server device returns the requested MSR.

In a specific embodiment where PS implements caching of MSR, the secondary server device hosting MSR may reply to a request from PS to obtain MSR by either sending MSR if it has been updated since the last transmission to PS or only indicating that MSR was not modified since that last transmission. For example HTTP 304 code may be used to provide this indication to PS and PS may request MSR through a conditional GET. This specific embodiment minimizes data transfer.

Once PS knows that it has the latest version of MSR, PS pushes (step 860) the at least one missing secondary resource MSR to the client device C over the network connection already established or the new network connection established at step 825.

Then, at step 870, PS notifies S of the success of the push operation and the process ends at step 890. As indicated above, this notification may comprise performance information on the push operation, for instance the transfer duration, the total time elapsed from the reception of the push request REQ2-3 to the end of the transfer, the CPU load, the memory load, etc. Such performance information is indeed helpful for S to determine whether PS may be used as a Push Server or not (above test 710).

Where the push operation fails at step 860 (because of network difficulties for example), a notification for push operation failure may be sent to S by PS. In that case, as suggested above with reference to step 830, the failure notification may comprise the missing secondary resource MSR to be pushed or a value indicating its last update.

As disclosed above, the invention makes it possible for a requesting client device to efficiently (i.e. in a short time) obtain secondary resources before discovering that it needs them, even if some secondary resources are not hosted by the requested server device. Generally, if the requested server device pushes the secondary resources it hosts to the client device and requests the secondary server devices to push missing secondary resources to the client device before sending the main requested resource, the timing appears adapted for the client device to not discover that it needs the secondary resources before receiving them. This situation provides great efficiency of the present invention.

A particular embodiment of the invention provides a slight adaptation of the above-described processes. In detail, the main server device may transmit a token together with the requested main resource R to the client device (in response to REQ1) and insert the same token in the request REQ2-3 to the secondary server device to push the at least one missing secondary resource to the client device. Then the secondary server device may push the at least one missing secondary resource to the client device together with the token included in the request received from the main server.

Thanks to this provision, the client device can check that a push from a secondary server device was really requested by the requested main server device since it can compare the token received contemporaneously with the requested main resource R and the tokens (normally similar) received together with pushed secondary resources.

An exemplary application of the invention regards a plurality of server devices belonging to the same organization to serve data. This is for example the case of the Wikipedia foundation (trademark), whose computer structure provides a first server "wikipedia.org" hosting main resources (articles in web page form) and a plurality of other servers, for instance "upload.wikimedia.org" and/or "bits.wikimedia.org", hosting secondary resources (e.g. media, images). When requesting a wikipedia article from "wikipedia.org", requests to the other servers are likely to be made by the same client device.

In the context of the present invention, it may be noted that the different server devices are managed by the same organization thus providing a safe or trusted environment where all the server devices can trust each other. In addition, the clear identification of client device C from one server to another does not appear as a difficult issue. Finally, given that the same server devices are implied from one Wikipedia page to the other (when a client device surfs from one Wikipedia page to the other) and that persistent network connections are used (as with SPDY, for instance), network connections between client device C and the server devices are very likely to be already established and available. As a consequence, push can be performed over these persistent network connections by the server devices.

Implementation of the present invention in that situation may be summarized as follows: Push Server PS for pushing a missing secondary resource MSRi is always the server device hosting MSRi (identified at step 720); a network connection between each server device and the client device is always available once a first page has been loaded (test 810). On the client device side, there is no need for an associated server, nor for authorizing "on-behalf-of" push.

Hence, once "wikipedia.org" receives a request from the client device for a new article, it requests the other server devices ("upload.wikimedia.org" and/or "bits.wikimedia.org") to push the secondary resources for that new article and then sends the web page defining the requested article. In parallel, "upload.wikimedia.org" and/or "bits.wikimedia.org" push the secondary resources to the client device as requested by "wikipedia.org".

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of transmitting a digital resource in a client-server communication system, the method comprising, at a main server device:
   receiving a request for a main resource from a client device;
   determining a file name identifying at least one missing secondary resource, wherein the at least one missing secondary resource is at least one resource associated with said requested main resource and missing at the server device;
   requesting a secondary server device to push a file having the file name identifying the at least one missing secondary resource to the client device; and
   at the main server device, transmitting the requested main resource to the client device in response to the request from the client device,
   wherein requesting the secondary server device to push the at least one missing secondary resource is prior to transmitting the requested main resource to the client device.

2. The method of claim 1, wherein the at least one missing secondary resource is hosted by the requested secondary server device.

3. The method of claim 1, further comprising at the main server device:
   receiving from the secondary server device a notification that the at least one missing secondary resource has been pushed to the client device in response to the request sent by the main server device.

4. The method of claim 3, wherein the requested main resource is sent by the main server device to the requesting client device after receiving the notifications from the requested secondary server devices for all the requests sent by the main server device.

5. The method of claim 1, further comprising, at the main server device, identifying at least one hosted secondary resource that is associated with the requested main resource and hosted by the main server device; and pushing the at least one identified hosted secondary resource to the client device.

6. The method of claim 1, further comprises at the main server device, determining whether a secondary server device has capabilities to operate as a push server to push a resource to the client device.

7. The method of claim 6, wherein determining whether a secondary server device has capabilities to operate as a push server comprises determining whether a network connection between the secondary server device and the client device is already established or the secondary server device is authorized to establish a new network connection with the client device.

8. The method of claim 6, wherein determining whether a secondary server device has capabilities to operate as a push server to push a resource to the client device is performed by the main server device prior to requesting the secondary server device to push the at least one missing secondary resource to the client device in case of positive determination.

9. The method of claim 6, wherein in case of negative determination, the main server device requests the at least one missing secondary resource from the secondary server device and pushes the at least one missing secondary resource received from the secondary server device to the client device.

10. The method of claim 6, further comprising, in case of negative determination, determining at least one other server device trusted by the client device and/or the secondary server device and requesting the trusted server device to push the at least one missing secondary resource to the client device.

11. The method of claim 10, wherein the trusted server device has a network connection already established with the client device or is authorized to establish, on its own initiative, a new network connection with the client device.

12. The method of claim 10, wherein the trusted server device requests the at least one missing secondary resource from the secondary server device.

13. The method of claim 1, wherein the secondary server device determines whether it has a network connection already established with the client device or it is authorized to establish a new network connection with the client device; wherein, in case of positive determination, the secondary server device pushes the at least one missing secondary resource to the client device over the network connection already established or the new network connection once established.

14. The method of claim 13, wherein, in case of negative determination, the secondary server device requests a trusted server device to push the at least one missing secondary resource to the client device, the trusted server device having a network connection already established with the client device or being authorized to establish, on its own initiative, a new network connection with the client device.

15. The method of claim 14, wherein the request from the secondary server device comprises the missing secondary resource to be pushed.

16. The method of claim 14, wherein the trusted server device is the main server device.

17. The method of claim 1, wherein a secondary resource associated with the main resource is a resource referenced within the main resource.

18. The method of claim 1, wherein a secondary resource not referenced in the main source and associated with the main resource is a resource that is statistically requested after the main resource by the same client device.

19. The method of claim 1, wherein a secondary resource associated with the main resource is a resource requested by a script embedded within the main resource.

20. The method of claim 1, wherein determining at least one missing secondary resource that is hosted by a secondary server device comprises building a secondary server list including secondary server devices hosting missing secondary resources associated with the main resource, and sending the secondary server list to the client device.

21. The method of claim 1, wherein the client device comprises a cache memory configured to store requested main resources and secondary resources already received, and the client device sends a list of cached resources to the main server device and to secondary server devices.

22. The method of claim 1, wherein determining at least one missing secondary resource that is hosted by a secondary server device comprises determining, by the main server device, all the missing secondary resources hosted by the same secondary server device and sending, by the main server device, a single request to the secondary server device to push all the missing secondary resources that it hosts.

23. The method of claim 1, further comprising, at the main server device, transmitting a token together with the requested main resource to the client device and inserting the same token in the request to the secondary server device to push the at least one missing secondary resource to the client device.

24. The method of claim 23, wherein the secondary server device pushes the at least one missing secondary resource to the client device together with the token included in the request received from the main server device.

25. A server device in a client-server communication system, comprising:
 a communication interface for receiving a request for a main resource from a client device;
 a missing resource module configured to determine a file name identifying at least one missing secondary resource, wherein the at least one missing secondary resource is at least one resource associated with said requested main resource and missing at the server device;
 a requesting module for requesting a secondary server device to push a file having the file name identifying the at least one missing secondary resource to the client device; and
 a transmitting module configured to, at the main server device, transmit the requested main resource to the client device in response to the request from the client device,
 wherein the requesting module requests the secondary server device to push the at least one missing secondary resource prior to the transmitting module transmitting the requested main resource to the client device.

26. A client-server communication system comprising:
 a server device according to claim 25;
 a client device configured to request a main resource from the server device;
 at least one secondary server device.

27. A non-transitory computer-readable medium storing a program which, when executed by a microprocessor or computer system in a server device, causes the server device to perform the steps of:
 receiving a request for a main resource from a client device;
 determining a file name identifying at least one missing secondary resource, wherein the at least one missing secondary resource is at least one resource associated with said requested main resource and missing at the server device;
 requesting a secondary server device to push a file having the file name identifying the at least one missing secondary resource to the client device; and
 at the main server device, transmitting the requested main resource to the client device in response to the request from the client device,
 wherein requesting the secondary server device to push the at least one missing secondary resource is prior to transmitting the requested main resource to the client device.

28. The non-transitory computer-readable medium of claim 27, wherein the at least one missing secondary resource is hosted by the requested secondary server device.

* * * * *